Patented May 8, 1945

2,375,701

UNITED STATES PATENT OFFICE 2,375,701

COATING LACQUER

Thomas R. Smith, Newton, Iowa, assignor to The Maytag Company, Newton, Iowa, a corporation of Delaware No Drawing. Application September 9, 1942, Serial No. 457,745

1 Claim. (Cl. 260—32)

The present invention relates to coating lacquers and especially to a lacquer composed of a base of polystyrene or polymerized styrene dissolved in a solvent composed of 2-nitropropane, tetrachloroethane, toluene and butyl "cellosolve" (ethylene glycol ether) acetate. This novel coating may be quickly and easily applied as by dipping and brushing, dries very quickly and is highly resistant to atmospheric temperatures and conditions, as well as corrosive influences.

The novel coating lacquer further acts as a preservative and may be used as a coating on wood, metals and other surfaces where a coating or covering having the mentioned properties is desired or required. The resultant plastic surface covering is exceedingly wear resisting, tough yet substantially resilient, and forms a smooth surfacing as distinguished from the frosty or crinkly coatings obtained by the use of solvents now being used.

Further objects, advantages and capabilities will be apparent from the following description, or are inherent in the novel composition.

The basic ingredient of the present novel coating lacquer is polystyrene or polymerized styrene and this base is dissolved in a solvent composed of or including 2-nitropropane, tetrachloroethane, toluene and butyl "cellosolve" (ethylene glycol ether) acetate, the solvent constituents being preferably in substantially equal proportions. As an example of the composite solvent, I have employed a solution composed of approximately 25% of each of these four solvents and the resulting lacquer has given excellent results. However, it is to be understood that these proportions may be varied in accordance with the rate of drying, penetrating value and for other properties desired in the final coating, as this final coating is determined by the characteristics of the solvents used, even though the solvent evaporates.

The amount of solvent to be added is controlled or determined by the viscosity desired in the coating lacquer comprising the mixture of the solvents and the base material of polystyrene or polymerized styrene. It will be apparent that a different viscosity will be required for a lacquer to be applied by spraying or dipping than that desired for brushing. As the solvent evaporates when the lacquer is applied, the amount of solvent to be added need be just sufficient to give the proper viscosity or flowing characteristics for its application.

The novel lacquer composed of the ingredients as above stated requires no plasticizers. It is transparent and clear, and where color is desired, any suitable dye or pigment may be added.

It will be apparent from the above description that the invention comprehends a novel coating lacquer or surface covering suitably adapted for application to interior or exterior surfaces, and one which is highly resistant to deterioration by sunlight, atmospheric conditions and the elements. It may be readily and easily applied by any suitable method, and when applied, dries quickly and forms a smooth surface coating.

Having thus disclosed my invention, I claim:

A coating lacquer composed of polystyrene and a solvent of substantially equal parts of 2-nitropropane, acetylene tetrachloride, toluene and butyl ethylene glycol ether acetate.

THOMAS R. SMITH.